J. McCANN.
SHUTTLE.
APPLICATION FILED MAY 10, 1920.
1,346,037.
Patented July 6, 1920.
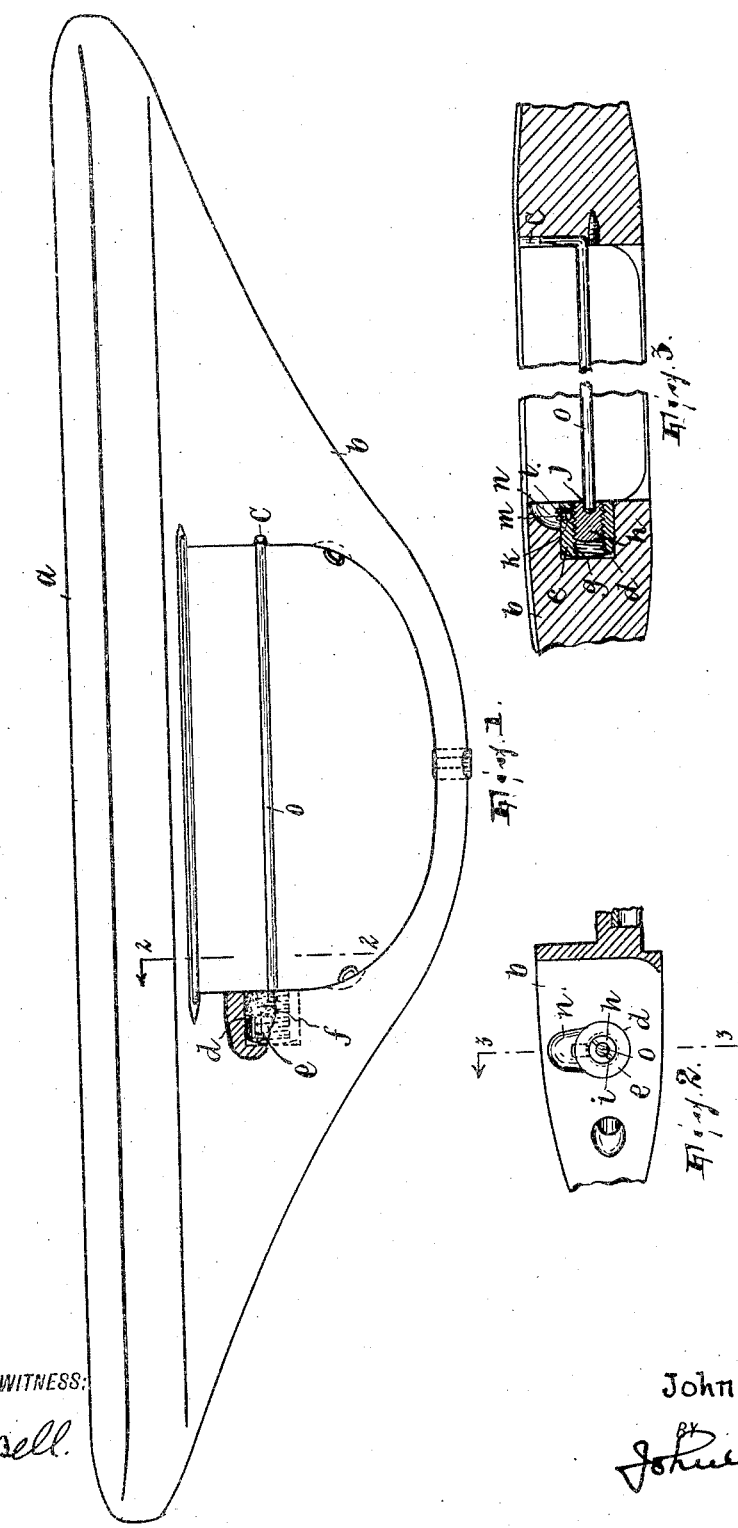
WITNESS:
W. Well.
INVENTOR,
John McCann,
BY
John ____
ATTORNEY

UNITED STATES PATENT OFFICE.

JOHN McCANN, OF PATERSON, NEW JERSEY.

SHUTTLE.

1,346,037.  Specification of Letters Patent.  Patented July 6, 1920.

Application filed May 10, 1920. Serial No. 380,075.

*To all whom it may concern:*

Be it known that I, JOHN McCANN, a citizen of the United States, residing at Paterson, in the county of Passaic and State of New Jersey, have invented certain new and useful Improvements in Shuttles, of which the following is a specification.

This invention relates to shuttles of the bow type such as are used in narrow-ware looms. The weft package or quill in such shuttles is supported by a spring pin or spindle which seats at one end in a socket in one side of the bow and has its other end sprung into a recess or groove in the other side of the bow. If the spindle becomes bowed a little too much in introducing it or removing it it is likely to and frequently does become freed while the shuttle is in action, which results in injury to the warp. My object is to provide for mounting the spindle in the shuttle bow so that it may be held in the shuttle at all times under just that tension required to keep it in place, and to construct the parts involved in my improvement so that the adjusting necessary from time to time may be readily performed and the state of adjustment effected will be reliably maintained.

In the accompanying drawing,

Figure 1 is a plan of a bow shuttle embodying my improvement, a part of the shuttle bow being broken away; and Figs. 2 and 3 are sectional views, Fig. 2 being a sectional view on the line 2—2 of Fig. 1 and Fig. 3 a sectional view on the line 3—3 of Fig. 2.

$a$ designates the shuttle having a bow structure which in the present instance comprises with the bow $b$ having the interior groove $c$ in one side thereof and an interior hole or recess $d$ bored in the other side thereof opposite the groove $c$, a bushing $e$ which is secured into the recess $d$, preferably by means of glue or cement as indicated at $f$. The exposed face of the bushing is preferably flush with the inside face of the bow.

The bushing is threaded internally, as indicated at $g$ in Fig. 3, and in it is tapped an externally threaded bearing device or screw $h$ whose exposed end has a cross-cut $i$ to receive a screw driver, and also a central bearing recess $j$.

Preferably the screw $h$ is held against turning in some suitable way, and since merely giving it a tight fit in the bushing would not be lasting enough in the presence of the constant vibration incident to the travel of the shuttle I provide in the present instance a means to hold the bushing which will have a positive and permanent action, and I arrange this means so that it is not only accessible but does not project in a way to be caught by the filling wound on the quill. To this end, a hole $k$ is tapped laterally in the bushing so as to open toward one side of the bow, and in this hole is screwed a lock screw $l$ having a cross-cut $m$ in its free end to receive a screw driver. The lock screw may be turned in against the bearing device $h$. To permit access to the lock screw, the bow $b$ is formed with a cut-out $n$ opening inwardly of the bow.

$o$ is the usual spindle on which the quill is mounted. One end of this spindle is adapted to seat in the recess $j$, and the other end is bent off in the usual way and adapted to be received in the groove $c$.

According to my invention, if the spindle when fitted into recess $j$ and groove $c$ appears to the weaver not to be sufficiently tightly held to insure its being reliably held in position, or if when the spindle is initially assembled with the shuttle it is a trifle too long, the lock screw $l$ is released, the bearing device $h$ is adjusted by turning it one way or the other with a screw driver, and then the lock screw set back into locking engagement with the bearing device.

Having thus fully described my invention, what I claim as new and desire to secure by Letters Patent is:—

1. In combination, with a shuttle bow structure having in one side an interior groove to receive one end of the quill spindle and with such spindle having its said end received in said groove, a screw-threaded bearing device tapped into the opposite side of said structure and having a bearing recess open toward the groove and receiving the other end of the spindle, said device being adjustable screw-fashion in the bow structure.

2. In combination, with a shuttle bow having in one side an interior groove to receive one end of the quill spindle and with such spindle having its said end received in said groove, an interiorly threaded bushing fixed in the opposite side of said bow and open toward said groove, and a screw-threaded bearing device screwed into said bushing and having a bearing recess receiving the other end of said spindle, said device being adjustable screw-fashion in the bushing.

3. In combination, with a shuttle bow having in one side an interior groove to receive one end of the quill spindle and with such spindle having its said end received in said groove, the bow having in its other side a socket opening toward the groove, an interiorly threaded bushing fixed in the socket, a screw-threaded bearing device screwed into the bushing and having a bearing recess opening toward the groove and receiving the other end of the spindle, said device being adjustable screw-fashion in the bushion, and a lock-screw tapped into the bushing laterally thereof and impinging the bearing device, said bow having a lateral cut-out affording access to the lock-screw.

In testimony whereof I affix my signature.

JOHN McCANN.